United States Patent [19]

Schaumburg

[11] 4,010,044

[45] Mar. 1, 1977

[54] BATTERY VENT

[75] Inventor: Ernest C. Schaumburg, West Lakeland, Minn.

[73] Assignee: Standard Oil Company, Chicago, Ill.

[22] Filed: Mar. 4, 1976

[21] Appl. No.: 664,017

Related U.S. Application Data

[63] Continuation-in-part of Ser. No. 545,032, Jan. 29, 1975, abandoned.

[52] U.S. Cl. .................................... 429/82; 429/88
[51] Int. Cl.² ......................................... H01M 2/12
[58] Field of Search ........................... 136/177, 178

[56] References Cited

UNITED STATES PATENTS

| | | | |
|---|---|---|---|
| 3,879,227 | 4/1975 | Hennen | 429/88 |
| 3,943,008 | 4/1976 | Schaumburg | 429/87 |

*Primary Examiner*—Anthony Skapars
*Assistant Examiner*—H. A. Feeley
*Attorney, Agent, or Firm*—Gregory E. Croft; Arthur G. Gilkes; William T. McClain

[57] ABSTRACT

An electric storage battery vent comprising first and second members inhibits battery explosions by venting gases generated within a battery through a narrow passage formed between said first and second members to a vent hole in one of said members.

15 Claims, 12 Drawing Figures

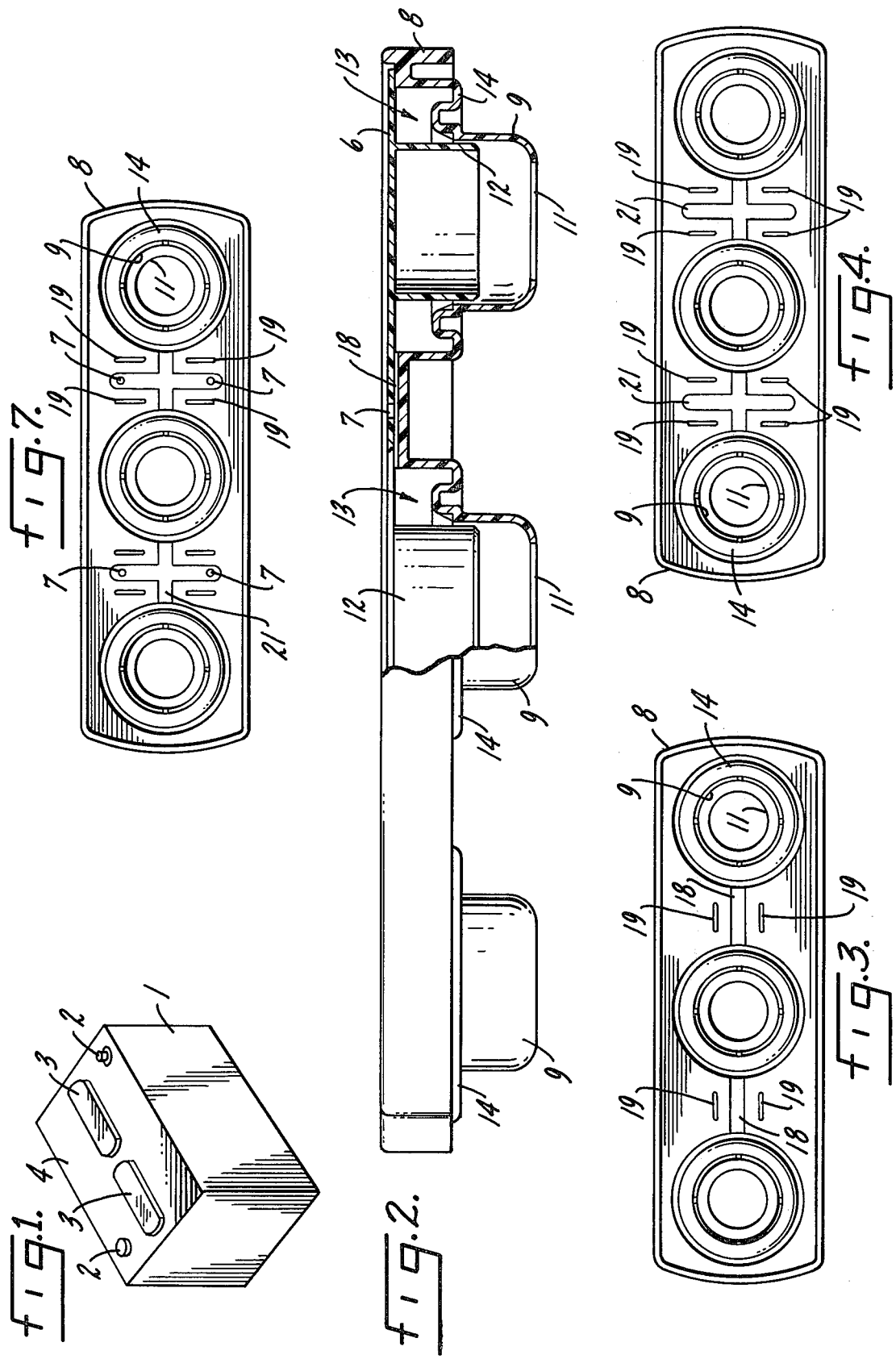

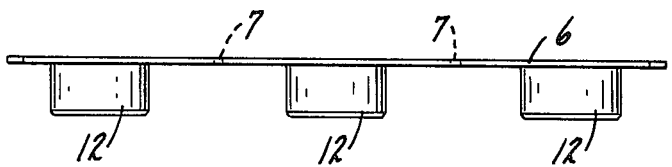
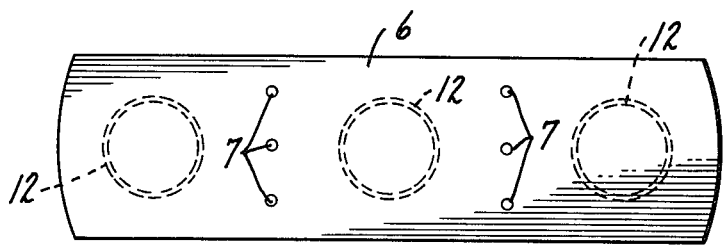
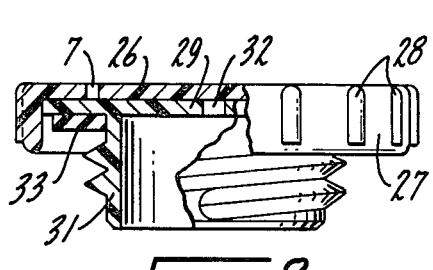
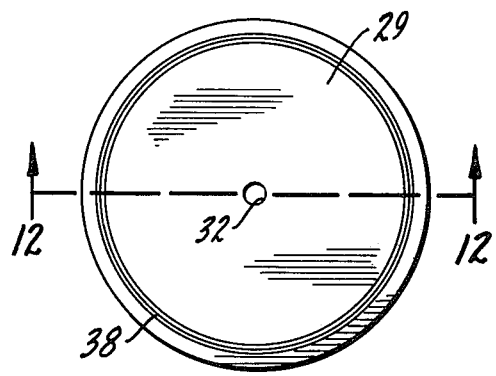
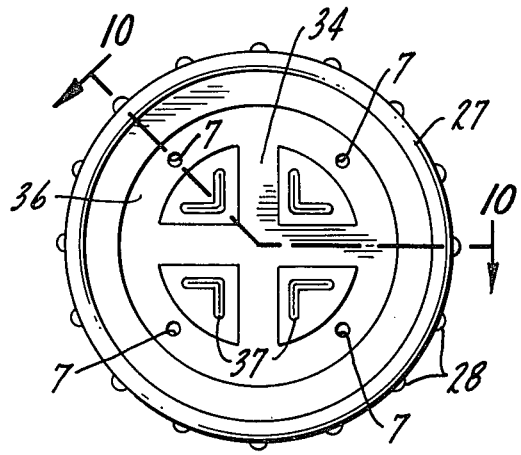
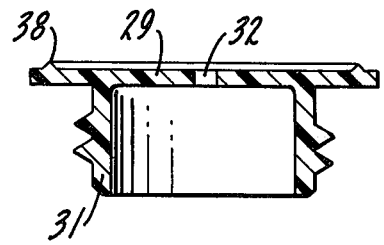
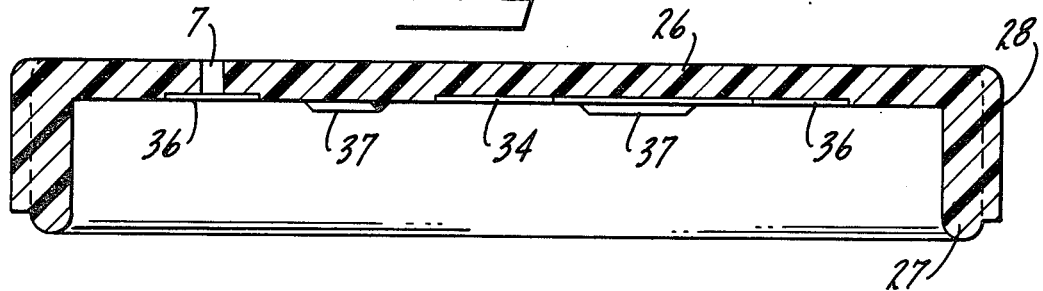

BATTERY VENT

This application is a continuation-in-part of U.S. Application Ser. No. 545,032, filed Jan. 29, 1975 now abandoned.

BACKGROUND OF THE INVENTION

1. FIELD OF THE INVENTION

This invention pertains to electric storage battery vent caps comprising first and second members. More particularly, it pertains to battery vents which greatly reduce the potential for explosions within the battery. This is accomplished by designing the vent cap in such a manner to vent battery gases through at least one very narrow passage formed between said first and second members.

2. DESCRIPTION OF THE PRIOR ART

A common problem in the battery industry today is the occurrence of battery explosions, generally occurring while the battery is receiving a fast charge or being jumped. When too high a current is applied for too long a time, large amounts of hydrogen and oxygen may be evolved by the electrolysis of water in the sulfuric acid solution. These gases must be vented, but should they be ignited by a flame or spark generated at the battery terminals, the resulting flame can propagate back into the battery cells causing the battery to explode. The exploding battery will spray sulfuric acid which can cause severe burns and blindness if contacted with the skin or eyes.

The prior art has recognized this problem and has responded by placing a rectangular porous ceramic insert into the battery vent, through which the battery gases are vented. This means performs well, but is unsatisfactory from the standpoint of cost. The insert itself is costly and requires that additional steps be taken to fabricate the battery vent, which makes the process more expensive as well.

I have invented a battery vent which is efficient in reducing the likelihood of battery explosions and yet is simple and inexpensive to fabricate. By properly designing a vent path between the first and second members of the battery vent, the porous insert can be eliminated.

SUMMARY OF INVENTION

Broadly, the invention resides in a battery vent comprising first and second members, a vent means, and a means on said second member for attachment to a battery through which gas can pass, wherein said first and second members fit closely together in such a manner that substantially all gas generated within a battery passes through at least one narrow passage formed between said first and second members to said vent means. The narrow passage between the first and second members may be created by at least one shallow groove in either member or both. Additionally, the vent means can be any channel or opening which permits the venting gases to escape to the atmosphere. Included are "vent holes", which are typically round in shape, and also the orifice defined by the perimeter of the narrow passage when the narrow passage is extended to the periphery of the battery vent, thus allowing gases to escape directly without actually having a vent hole per se.

In one aspect, the battery vent can have a plurality of bosses on the second member which depend into the battery lid and wherein there are a plurality of shallow grooves in the second member, each separately located between adjacent bosses such that each shallow groove is in communication with the void spaces within each boss, allowing each shallow groove to function as a narrow passage for both adjacent bosses simultaneously. At least one vent hole is placed in communication with each shallow groove.

In a further aspect, each narrow passage can be formed by the intersection of two shallow grooves resulting in a cross-shaped narrow passage. Each cross shaped narrow passage is separately located between adjacent bosses of the second member and one of said intersecting shallow grooves is in communication with the void spaces within each boss. The other intersecting shallow groove provides a place for at least one vent hole in communication with the narrow passage.

In a still further aspect, the invention resides in a battery lid wherein the aforesaid second member is actually an integral part of the lid and the first member has at least one vent hole. In the same manner as the previous aspects, the first member fits closely together with the second member so that substantially all gas generated within a battery passes through at least one narrow passage formed between said first and second members.

BRIEF DESCRIPTION OF THE DRAWING

FIG. 1 shows a perspective view of a battery with two gang-type battery vents in place on the lid.

FIG. 2 shows a partially cross-sectional side view of a gang vent with a single shallow groove between adjacent bosses.

FIG. 3 shows a plan view of the second member of FIG. 2.

FIG. 4 shows a plan view of the second member having a cross-shaped narrow passage between adjacent bosses.

FIG. 5 shows a side view of the first member of FIG. 2 with at least two vent holes, illustrating the baffles.

FIG. 6 shows a plan view of a first member having six optional vent hole locations.

FIG. 7 shows a plan view of a second member having vent holes.

FIG. 8 shows a side view, partially cut away, of an assembled single cell vent.

FIG. 9 shows a bottom view of the first member of FIG. 8.

FIG. 10 shows a sectional view of the first member taken along line 10—10 of FIG. 9.

FIG. 11 shows a plan view of the second member of FIG. 8.

FIG. 12 shows a cross-sectional view of the second member taken along line 12—12 of FIG. 11.

DESCRIPTION OF THE PREFERRED EMBODIMENTS

Directing attention to the drawing, my invention will be described in more detail.

FIG. 1 shows a battery 1 with two terminals 2 and a pair of gang battery vents 3 in place atop the battery lid 4. Although the gang type battery vents herein illustrated are each designed to vent three battery cells, it is clearly within the scope of this invention to design the battery vents to cover any number of battery cells simultaneously.

FIG. 2 shows a partially cross-sectional side view of an assembled gang vent having a first member 6 with at least two vent holes 7 (only one hole indicated). Shown is a skirt 8 around the bottom member; the downwardly protruding bosses 9 which plug the openings in the battery cell cover; an orifice 11 which allows electrolyte to drain back into the battery cell; three downwardly protruding cylinders 12 (only two shown) which prevent splashing electrolite from entering and accumulating in the void space 13; and a means for attachment to a battery comprising an "s-shaped" annular fold 14 which is flexible enough to adjust for center-to-center errors in the cell cover openings, providing a tight seal between the vent and the cell cover (lid). In operation, the battery gases are generated within each cell and enter the vent through orifice 11, which has a diameter of 0.50 inch. The gases then pass between the sidewall of the boss 9 and the downwardly protruding cylinder (baffle) 12 of the first member. It has been found that the distance between the inner wall of the boss and the downwardly protruding cylinder may range between 0.002 and 0.015 inch. The gases subsequently pass through void space 13 and then through a narrow passage formed between the first member and a groove 18 in the second member before exiting through the vent hole 7. The first member is attached to the second member by a sonic weld around the periphery of the first member and at additional selected points.

FIG. 3 is a plan view further illustrating the embodiment of the second member shown in FIG. 2 wherein the battery gases pass between the first and second members via a narrow passage comprising a shallow groove 18 in the second member which provides communication between a vent hole in the first member and the void space 13 of the second member. In this embodiment it is necessary that the first member be fastened tightly against the second member to insure that the narrow passage maintains the proper dimensions for dimensionally controlled flow of the gases. This is easily accomplished by sonic welding the two members together at various locations 19, as well as around the periphery of the members.

FIG. 4 illustrates the preferred embodiment of the second member for a gang-type vent. It differs from that shown in FIG. 3 only in the configuration of the narrow passage. This embodiment employs a cross-shaped narrow passage 21 comprising the intersection of two generally straight shallow grooves in the second member, wherein each cross-shaped narrow passage is separately located between two adjacent bosses. One of the two intersecting shallow grooves provides communication between the void spaces within the two adjacent bosses. The other shallow groove provides communication with at least one vent hole in the first member, preferably a plurality of vent holes. It is also preferred that all vent holes be located such that every molecule of venting gases must travel through the narrow passage a distance of at least 0.18 inch. This applies to all embodiments of this invention. Shorter paths would lessen the ability of the battery vent to prevent flame propagation back into the battery. Also, the depth of each shallow groove should be sufficient to allow free flow of gases but shallow enough to prevent flame propagation. A depth range from 0.001 to 0.015 inch is considered satisfactory, with a depth of about 0.004 inch being preferred. No restrictions on the width of the narrow passage are known. Also, as indicated previously, the first member must be tightly fixed to the second member during operation, thus requiring additional weld locations 19.

FIG. 5 shows a side view of a preferred embodiment of the first member for a gang-type battery vent. This design is the same as that shown in FIG. 2. Shown is the generally flat portion 6 of the first member with a thickness of 0.03 inch, the vent hole locations 7, and the downwardly protruding cylinders (baffles) 12. The material of the first member is polypropylene, as is the second member, but the invention should not be construed as being limited to any specific material.

FIG. 6 shows a plan view of the first member as viewed from above. It illustrates two sets of three possible locations for vent holes. Any combination of vent holes may be used, providing there is at least one vent hole for each narrow passage located between adjacent bosses. As indicated in this figure and those previously described, it is preferred that the vent holes be located in the first member and the shallow grooves be located in the second member. The primary purpose for venting gases through the first member is that there are no pockets within the exterior of the first member in which vented gases could collect. Underneath the second member, however, there are places where the hydrogen might be trapped, causing an explosion hazard. The size of the vent holes may vary between 0.01 inch to 0.13 inch in diameter. In the preferred embodiment the vent hole diameter is 0.03 inch.

FIG. 7 shows the second member of FIG. 4 with vent holes 7, illustrating that the vent holes need not be confined to only the first member. The grooves and vent holes can be in either member, or both, without departing from the scope of this invention.

FIG. 8 shows a side view of an assembled single-cell battery vent of the screw-on variety comprising first and second members. This embodiment retards flame propagation in the same manner as the gang-type battery previously described, i.e., the venting battery gases pass through a narrow passage formed between first and second members. Shown in this figure is the first or top member having the shape of a generally flat disc 26 with a depending skirt 27. The skirt has a plurality of protruding finger grips 28 spaced around the circumference thereof. The second or bottom member has a flat disc portion 29 and a hollow threaded cylinder portion 31 depending therefrom. The flat disc portion of the second member has a hole 32 in its center which permits battery gases to enter the narrow passage formed between the first and second members and subsequently pass through at least one of the vent holes 7 located in the first member. Also shown in this figure is a rubber sealing gasket 33 which assures prevention of gas and fluid leaks.

FIG. 9 is a bottom view of the first member showing the shape of the grooves which form the narrow passage. Shown is the underside of the generally flat disc containing a cross-shaped groove 34 encircled by a connecting with a circular groove 36 in which is located at least one vent hole 7. In this embodiment there are four vent holes located such that venting gases must travel a maximum distance through the narrow passage before reaching a vent hole. As with previous embodiments, it is preferred that the gases travel at least a distance of 0.18 inch through the narrow passage, which can have a depth from 0.001 to 0.015 inch. In this embodiment the narrow passage has a length of about 0.5 inch and a depth of about 0.004 inch. The vent hole diameter can be between 0.01 and 0.13 inch, with 0.03 inch being preferred. Also shown are the "L"-shaped sonic weld points 37 which help secure the first member to the second member.

FIG. 10 is a blown up sectional view of the first member taken along line 10—10 of FIG. 9 to further illustrate the narrow passage. Shown is a vent hole 7, a cross-section of the circular groove 36, a portion of the "L"-shaped sonic weld point 37, and a section of the cross-shaped groove 34. The sonic weld points protrude a distance of 0.015 inch, while the depth of the groove is only about 0.004 inch. It can be seen that the effective depth of the narrow passage is dependent upon how well the sonic welding is done. If the protruding sonic weld point is not completely flattened, the depth of the narrow passage will be correspondingly greater. However, the dimensions given here for this embodiment has proven effective in inhibiting battery explosions.

FIG. 11 is a plan view of the second member illustrating the flat disc portion 29, the hole 32 therein, and a circular sonic welding ridge 38, which protrudes 0.015 inch, same as the others.

FIG. 12 is a sectional view taken along line 12—12 of FIG. 11, further illustrating the second member. Shown is the hole 32, the circular sonic welding ridge 38, and the hollow threaded cylinder portion 31 of the second member.

It will be obvious to those skilled in the art that many variations can be made from the embodiments chosen for purposes of illustration without departing from the scope of this invention.

I claim:

1. A battery vent comprising:
   a. a first member;
   b. a second member positioned adjacent to said first member;
   c. a vent means;
   d. a narrow passage formed between said first and second members in gaseous communication with said vent means, said narrow passage having a depth between 0.001 and 0.015 inch and a length such that venting gases must travel at least 0.18 inch through said narrow passage; and
   e. means on said second member for attachment to a battery through which gas can pass from the battery to said narrow passage, wherein said battery vent acts to inhibit battery explosions.

2. A battery vent comprising:
   a. a first member;
   b. a second member positioned adjacent to said first member;
   c. at least one vent hole in at least one of said members;
   d. a narrow passage formed between said first and second members in gaseous communication with said vent hole(s), said narrow passage having a depth between 0.001 and 0.015 inch and a length such that venting gases must travel at least 0.18 inch through said narrow passage; and
   e. means on said second member for attachment to a battery through which gas can pass from the battery to said narrow passage, wherein said battery vent acts to inhibit battery explosions.

3. The battery vent of claim 2 wherein each vent hole has a diameter from 0.01 to 0.13 inch.

4. The battery vent of claim 2 wherein each vent hole has a diameter of approximately 0.03 inch.

5. The battery vent of claim 2 wherein the depth of the narrow passage is about 0.004 inch.

6. The battery vent of claim 2 wherein the narrow passage is formed by a shallow groove in the second member.

7. The battery vent of claim 2 wherein said second member has three depending bosses adapted to be inserted into a battery and two cross-shaped shallow grooves, about 0.004 inch deep, separately located between adjacent bosses forming a cross-shaped narrow passage between said first and second members.

8. The battery vent of claim 7 wherein said first member has three downwardly extending cylinders adapted for insertion into the corresponding boss of the second member and from one to three vent holes located between adjacent cylinders.

9. The battery vent of claim 8 wherein the distance between the downwardly extending cylinder and the inner wall of the boss is from 0.002 to 0.015 inch.

10. The battery vent of claim 9 wherein the means for attachment to a battery resides in flexible annular folds or bellows around each boss which allow the battery vent to adjust to center-to-center errors in the battery cell cover.

11. The battery vent of claim 2 adapted for single cell use wherein the first member is a generally flat disc with a depending circumferential skirt, the underside of the disc containing a cross-shaped groove encircled by and connecting with a circular groove in which is located at least one vent hole; and wherein the second member has a flat disc portion and a hollow threaded cylinder portion depending therefrom, said hollow threaded cylinder portion being adapted to screw into a battery cell opening, and said flat disc portion having a hole therein which permits battery gases to enter the narrow passage formed by the grooves of the first member and the corresponding portions of the second member.

12. The battery vent of claim 11 wherein the depth of the narrow passage is about 0.004.

13. The battery vent of claim 12 wherein gas must pass through the narrow passage a distance of about 0.5 inch.

14. The battery vent of claim 13 having four vent holes with a diameter of about 0.03 inch.

15. A battery lid comprising:
   a. a first member;
   b. a second member which is an integral part of the battery and positioned adjacent to said first member;
   c. at least one vent hole in said first member;
   d. a narrow passage formed between said first and second members in gaseous communication with said vent hole(s), said narrow passage having a depth between 0.001 and 0.015 inch and a length such that venting gases must travel at least 0.18 inch through said narrow passage; and
   e. means of gaseous communication through said second member between the battery cell and said narrow passage.

* * * * *

UNITED STATES PATENT OFFICE
CERTIFICATE OF CORRECTION

Patent No. 4,010,044          Dated   March 1, 1977

Inventor(s)  Ernest C. Schaumburg

It is certified that error appears in the above-identified patent and that said Letters Patent are hereby corrected as shown below:

Column 1, line 4, after "1975" insert a -- , --.

Column 3, line 6, "electrolite" should read -- electrolyte --.

Column 4, line 56, "by a" should read -- by and --.

Signed and Sealed this

Seventeenth Day of May 1977

[SEAL]

Attest:

RUTH C. MASON
Attesting Officer

C. MARSHALL DANN
Commissioner of Patents and Trademarks